April 12, 1932. H. KRANTZ 1,853,821
CENTRIFUGAL EXTRACTOR
Filed May 20, 1929 3 Sheets-Sheet 1

Inventor
H. KRANTZ

April 12, 1932.  H. KRANTZ  1,853,821
CENTRIFUGAL EXTRACTOR
Filed May 20, 1929   3 Sheets-Sheet 2

Inventor
H. KRANTZ
By [signature]
Attorney

April 12, 1932.                H. KRANTZ                1,853,821
                        CENTRIFUGAL EXTRACTOR
                    Filed May 20, 1929        3 Sheets-Sheet 3

Inventor
H. KRANTZ
By
Attorney

Patented Apr. 12, 1932

1,853,821

UNITED STATES PATENT OFFICE

HUBERT KRANTZ, OF AACHEN, GERMANY

CENTRIFUGAL EXTRACTOR

Application filed May 20, 1929. Serial No. 364,584.

This invention relates to centrifugal extractors, and it has more particularly reference to extractors of the kind in which the casing is removably mounted on a bottom or base and suspended by this base from a number of posts preferably spaced at equal distances about the periphery of the extractor.

In the known extractors of this kind, which are provided with a belt or motor drive for the basket, controlling means for the drive, braking means, cover locking means, and sometimes still with a time control device for stopping the extractor after a predetermined period, always some of these parts or supporting means for these parts are attached to the casing. Therefore, if it is intended to lift the casing off its base for inspecting or repairing the basket and the brake which are disposed within the casing, it is necessary to detach and remove the parts carried by the casing from the same. On the other hand, when remounting the casing all parts must be re-attached to it in exactly the same position they were before, but this is very difficult because the seating of the lower end of the casing shell on the packing in the bottom or base is generally inaccurate. Therefore, the removing and remounting of the casing requires much time and is connected with serious difficulties, the reassembling often causing even deleterious distortions of the casing and other extractor parts.

Now, it is the object of the present invention to provide an improved extractor construction which allows the casing to be removed and remounted without any difficulties and in a minimum of time, this object being attained by mounting all accessories of the extractor on brackets of the swingingly suspended base leaving the casing proper entirely free.

Figure 1:
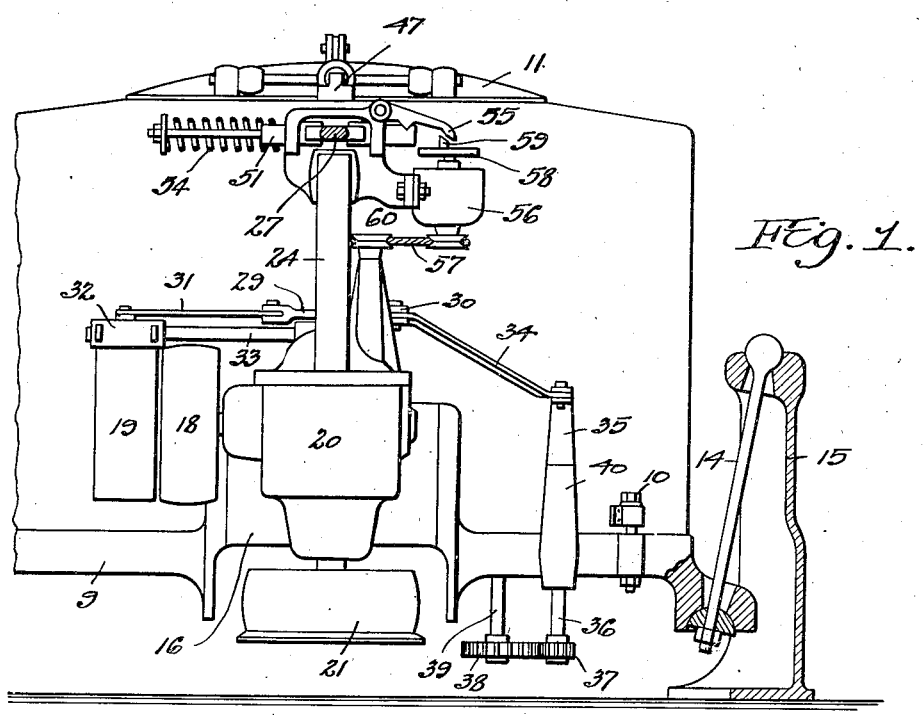
Figure 2:
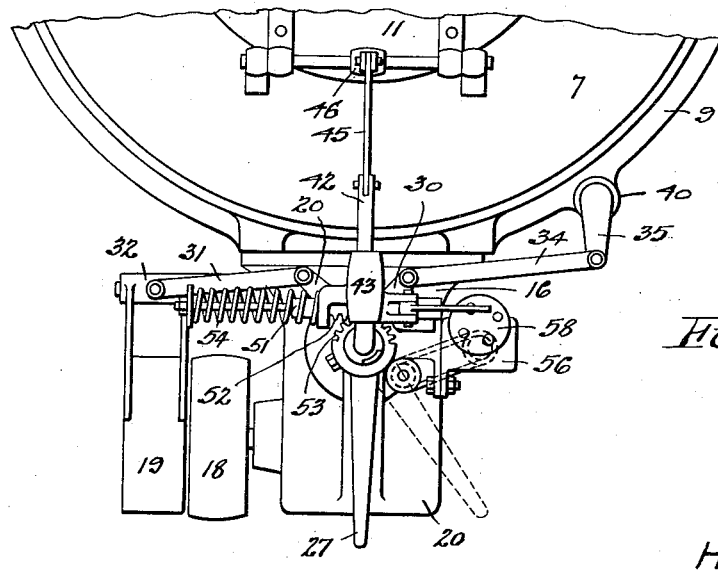
Figure 3:
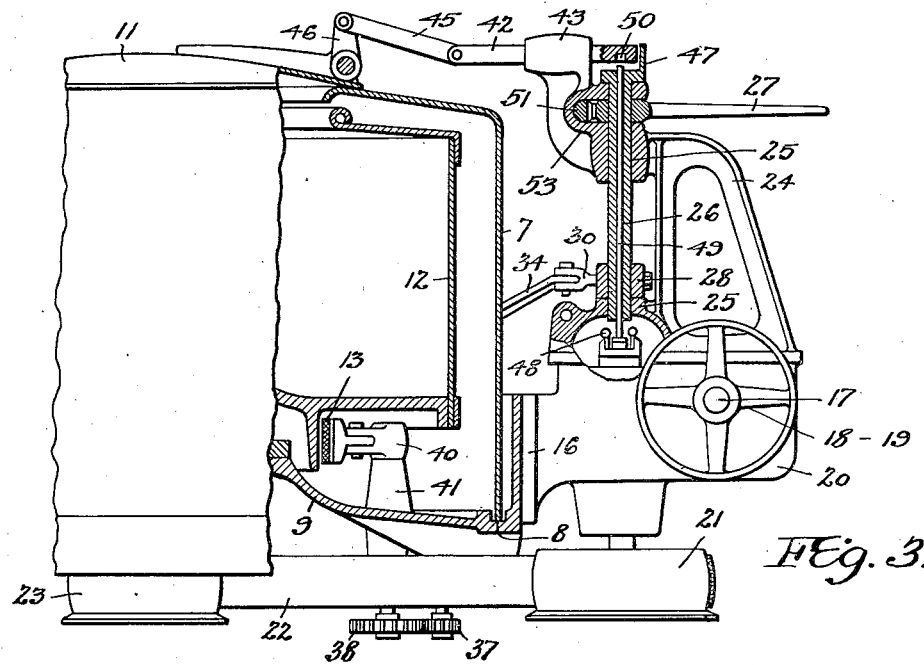
Figure 4:
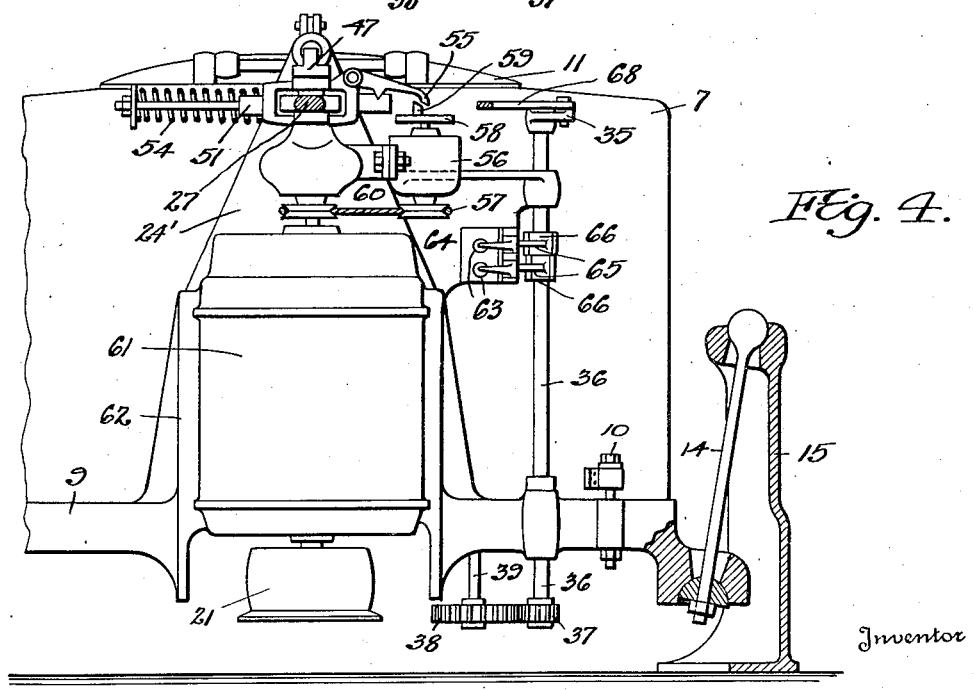
Figure 5:
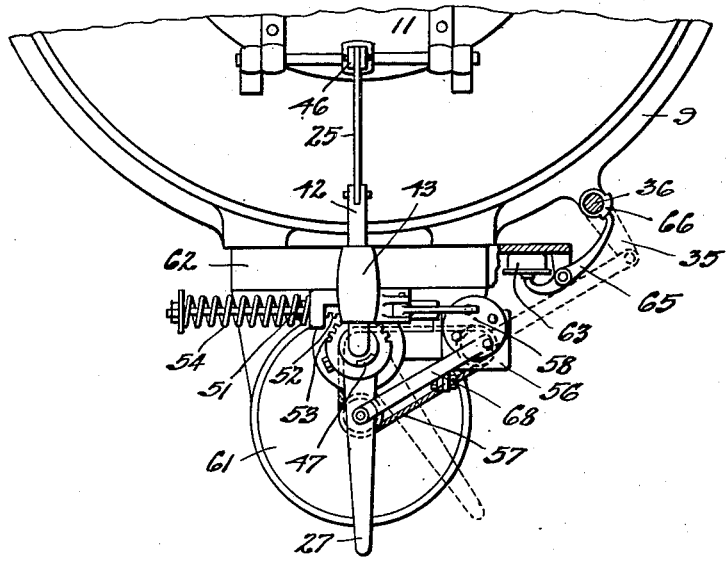
Figure 6:
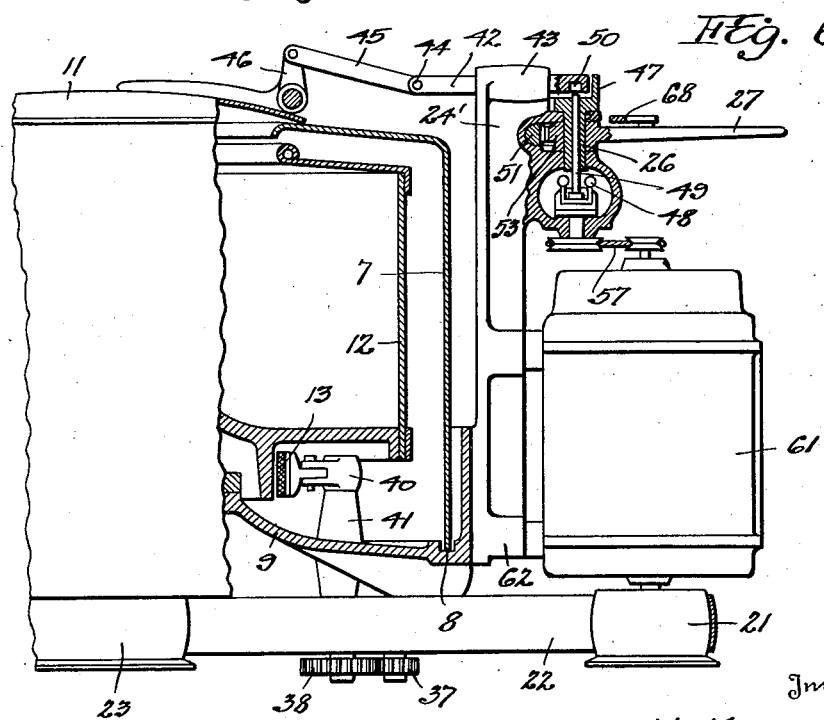

Some forms of the invention are illustrated, by way of example, in the accompanying drawings. Fig. 1 is a fractional front elevation, partly in section, of a belt driven extractor. Fig. 2 is a plan view thereof, and Fig. 3 is an elevation partly in section, at a right angle to Fig. 1. Fig. 4 is an elevation, similar to Fig. 1, of a motor driven extractor, Fig. 5 is a plan view thereof, and Fig. 6 is an elevation, partly in section, at a right angle to Fig. 4.

Referring first to Figs. 1 to 3, the numeral 7 designates the casing, the shell of which is seated by its lower end on a packing 8 in an annular groove of the base or bottom 9. To hold the shell tightly seated on the base, there are provided a plurality of screws 10 which connect the casing with the base. 11 is the hinged cover of the casing. Mounted for rotation in the casing 7 is the basket 12, which is provided at its lower end with a band brake 13. The casing is suspended by its base through rods 14 in a number of posts 15 which are arranged at equal distances about the periphery of the casing. Attached to the base 9 is a bracket 16 supporting the drive of the extractor. The drive consists of a horizontal shaft 17 with fast and loose pulleys 18 and 19 and a convenient transmission gearing which is encased in a box 20 formed by the bracket 16 and adapted to impart rotation to a belt pulley 21. The pulleys 18 and 19 are rotated by a shiftable power driven belt (not shown), while the pulley 21 is connected through a belt 22 with a pulley 23 on the lower end of the spindle of the basket 12. Mounted on the bracket 16 is an upright standard 24. This standard has lower and upper bearings 25, 25 for a vertical hollow shaft 26 which is adapted to be rocked in one direction by a hand lever 27. Rigidly attached to the shaft 26 by means of a collar 28, Fig. 3, are two crank arms 29 and 30. Arm 29 is connected by a link 31 to the belt shifter 32 which is shiftable on a rod 33 fastened to the standard 24. The crank arm 30 is designed to actuate the basket brake 13. To this end, it is operatively connected through link 34, crank arm 35, shaft 36, gear wheels 37, 38, shaft 39 and arm 40 with the brake 13. It will be seen from the drawings, that those parts of the brake actuating mechanism, such as the shafts 36 and 39, which have to be supported, are mounted in bearings 40 and 41 formed by the base 9.

The cover 11 is provided with a safety device which prevents opening of the cover as long as the basket 12 is rotating and prevents starting of the drive as long as the cover is in open position. This safety device comprises a rod 42 horizontally shiftable in a guide 43 formed or carried by the standard 24. The rod 42 is pivotally connected by a pin 44 with a link 45, the other end of which is pivotally connected with an arm 46 fastened to the hinge shaft of the cover 11. When the cover is closed and the extractor is operating a lug 47 carried by the vertical hollow shaft 26 is in alinement with the rod 42 and prevents shifting of this rod so that the cover cannot be opened. When the parts are brought into the position to stop the machine, the lug 47 is moved out of the path of movement of the rod 42 so that it does no longer prevent opening of the cover. However, the cover can only be opened when the basket has come to complete standstill. This is attained by a centrifugal device 48 which is kept rotating by the driving gear as long as the basket revolves. When the centrifugal device is in rotation, it acts on a pin 49 guided in the hollow shaft 26 and pushes this pin upwardly so as to cause its upper end to project into a recess 50 of the rod 42 holding the same in locking position. Only upon the basket having come to a dead stop, the pin 49 is allowed to move down by gravity and release the rod 42 so that the cover 11 can be opened.

Mounted for horizontal shifting motion in the upper portion of the standard 24 is a bar 51 having rack teeth 52, which are engaged by a toothed wheel or segment 53 mounted on the hollow shaft 26 and adapted to be rocked by the hand lever 27. The bar 51 is encircled by a spring 54. When the lever 27 is moved to starting position, by which movement the brake 13 is released and the driving belt moved from the loose pulley 19 to the fast pulley 18, the bar 51 is shifted to the right hand, Figs. 1 and 2, whereby the spring 54 is compressed. The bar 51 is locked in its right hand position by a latch 55. The spring 54 constitutes the power for disconnecting the drive from the basket, applying the brake and unlocking the cover safety device. When the latch 55 is released, the spring 54 expands and moves the bar 51 toward the left, whereby same imparts through the gear members 52, 53 rotation to the vertical shaft 26 in such a manner that this shaft through the parts described causes the driving belt to be shifted from the fast pulley 18 to the loose pulley 19, the brake 13 to be applied and the lug 47 to be moved out of the path of movement of the rod 42.

In the embodiment shown, the release of the latch 55 is effected automatically after a predetermined period of operation by a time control device 56, which is operated in any suitable manner from one of the revolving elements of the extractor through a cord drive 57 or the like and which is adapted to act on the latch 55 through cams 59 of a rotating disk 58 which forms part of the control device. This control device is fastened on a lateral arm 60 of the vertical standard 24.

The form of extractor shown in Figs. 4 to 6 differs from that shown in Figs. 1 to 3, in that it is driven by an electric motor 61. The motor is supported on a bracket 62 of the base 9, which has integrally formed therewith a standard 24' corresponding to the standard 24 of the extractor described first. The belt shifter is replaced by switch buttons 63 for the motor circuit. These switch buttons are supported on a lateral bracket 64 of the standard 24'. The buttons are actuated through levers 65, which are supported on the bracket 64 and designed to be acted upon by cams 66 which are fastened on the shaft 36. In this form, the shaft 36 is somewhat longer than the shaft 36 in the first embodiment. It is not only mounted in a bearing 40 of the base 9 but also in an upper bearing 67 which is formed by the bracket 64. The crank arm 35 of the shaft 36 is connected by a link 68 directly with the hand lever 27. The other parts are more or less similar to corresponding parts of the extractor shown in Figs. 1–3 and therefore are denoted by similar numerals of reference.

It will be seen from the above description with reference to the accompanying drawings, that all accessories of the extractors are carried by the base 9 and have no connection with the casing 7. In order to remove the casing it will be sufficient to loosen the screws 10 and to withdraw the pivot pin 44 between the rod 42 and the link 45, whereupon the casing 7 can be lifted off the base 9 without any difficulties and within a minimum of time. The casing can be re-mounted as easily and quickly on the base 9.

I wish it to be understood that, while I have shown and described some forms of extractors with all mechanisms with which such extractors are nowadays generally provided, the construction of the extractors and the construction, arrangement and operation of the several devices and mechanisms combined therewith may widely vary and be of any other well-known or convenient form without limiting the scope of the present invention, which consists in mounting all accessories of an extractor on the base or brackets thereof so as to allow the casing to be readily removed and re-mounted.

Having thus described my invention, what I claim as new and desire to secure by Letters Patent, is:—

1. In a centrifugal extractor, a casing consisting of a bottom and a cylindrical shell, with the lower edge resting on the bottom to thereby complete the casing, means for securing the shell removably to the bottom, whereby on the release of the securing means the shell may be freely lifted from the bottom, a rotatable basket operative within the shell and above the bottom, a bracket carried solely by and projecting from the bottom and wholly free of any connection with the shell, power means by which the basket is rotated supported solely by the bracket, a brake for the basket, and means for controlling the power means and for operating the brake supported solely on the bracket whereby on the disconnection of the securing means between the shell and bottom the shell may be freely removed from the bottom to permit access to the interior of the extractor without the necessity of disturbing the relation or interfering with the connections of the means carried by the bracket.

2. In a centrifugal extractor, a casing made up of a bottom formed with an annular packing groove, a cylindrical shell with its lower edge seated in said groove, means for removably connecting the shell and bottom to seal the connection of said shell in the packing groove, a rotatable basket operative within the shell and above the bottom, a bracket carried solely by and projecting from the bottom and wholly free of any connection with the shell, power means by which the basket is rotated supported solely by the bracket, a brake for the basket, and means for controlling the power means and for operating the brake supported solely on the bracket, whereby on the disconnection of the securing means between the shell and bottom, the shell may be freely removed from the bottom to permit access to the interior of the extractor without the necessity of disturbing the relation of or interfering with the connections of any of the means carried by the bracket.

In testimony whereof I have signed my name to this specification.

HUBERT KRANTZ.